TIME SHARED INTERCONNECTION APPARATUS

Filed July 15, 1968 2 Sheets-Sheet 1

INVENTOR
FRITZ H. GAENSSLEN

BY Thomas J. Kilgannon Jr.
ATTORNEY

TIME SHARED INTERCONNECTION APPARATUS

Filed July 15, 1968 2 Sheets-Sheet 2

United States Patent Office 3,560,940
Patented Feb. 2, 1971

3,560,940
TIME SHARED INTERCONNECTION APPARATUS

Fritz H. Gaensslen, Yorktown Heights, N.Y., assignor to International Business Machines Corporation, Armonk, N.Y., a corporation of New York Filed July 15, 1968, Ser. No. 745,026
Int. Cl. G11c *11/40;* H03k *3/286*
U.S. Cl. 340—173 26 Claims

ABSTRACT OF THE DISCLOSURE

An array of actuable devices each requiring two inputs for actuation is disclosed. During a first time period, one row of the array is separately actuable via common interconnections to columns of actuable devices and a common row connection and stores information in binary form. Each of the devices in the row is connected to a column of actuable devices and to an actuable gate which is actuated or not actuated depending on the state of the actuable devices of the separately actuated row. Each gate is also connected to a separate row of the array. During a second time period, the columns of actuable devices, are actuated from pulsed sources via their common interconnection and from a pulsed source connected in common to all the gates. Since only one gate connected to a row is actuated and all columns of devices are actuated, only those devices in that row are actuated. In a memory environment, the foregoing operation is characterized as writing. To detect the condition of selected of the actuated devices, an actuable gate is selected during a first time period and, during a second time period, sensing devices are connected to the columns of actuable devices and, the common interconnection to a row of actuable devices is activated from a pulsed source. In a memory environment, the foregoing operation is characterized as reading. The actuable devices may be memory cells, bistable circuits or the like. The arrangement shown is particularly adapted to the semiconductor chip environment where reduction of interconnections is a significant design factor. Other arrangements showing decoding on the chip and more than two time periods are also disclosed.

BACKGROUND OF THE INVENTION

Field of the invention

This invention relates generally to interconnection arrangements for actuable devices requiring at least two inputs for actuation. More specifically, it relates to interconnection arrangements for arrays of memory cells and the like in an integrated circuit environment. The arrangements shown are particularly adaptable to memories which do not require high speed operations permitting a trade-off to be made between time and the number of interconnections. Thus, if sufficient time is available, common interconnections may be shared in different time periods to effect a result which would require a greater number of interconnections if the same result was desired in the shortest time possible. The larger the storage array, the larger is the saving due to the reduction in the number of interconnections.

Description of the prior art

The concept of time sharing is well known in the communications art. More information is transmitted usually by transmitting only a portion of the information available in a shorter time period using a sampling technique. In general this technique is applied to analog information such as speech where all the information available is not required to reconstitute the analog signal at a receiving station. Operationally, however, in prior art arrangements there is no interaction between information provided during the different sampling periods whereas in the present arrangement there is interaction between information transmitted and stored in digital form in a first time period and other digital information provided in another time period.

In the memory environment, the reduction of interconnections to an array of actuable devices does not appear to have been a major problem. Since speed has been the governing criterion in the past, the simultaneous energization of an actuable device such as a memory cell was carried out in the shortest time. However, the application of semiconductor devices to monolithic or integrated circuit memories along with an increase in bit density requirements has caused a reconsideration of the time requirement as a major design criterion. Manufacturing and processing steps and their reduction or optimizing is now a significant design requirement; the minimization of space and power requirements, and the reduction in the number of devices to accomplish the same result are also major considerations. All these problems have been attacked by the prior art and considerable advantage has resulted. The prior art, however, apparently has not applied the time sharing of interconnections concept in reducing interconnections, power requirements and the number of devices required.

SUMMARY OF THE INVENTION

The apparatus of the present invention, in its broadest aspect, comprises a plurality of actuable devices such as memory cells or bistable circuits which require at least two inputs for actuation. Selection means consisting of a portion of the actuable devices and a plurality of actuable gates are connected via two groups of common interconnections to provide inputs to each of the actuable devices other than those of the above mentioned portion. During a first time period, the portion of actuable devices is energized over a first group of common interconnections and from an interconnection connected to only the devices of the portion. The portion, while it is a portion of the plurality of actuable devices, acts as a register or temporary store during the first time period. A device of the portion is then placed in a binary one condition, for example, all the remaining devices of the portion being set to a binary zero. Each of the devices of the portion is connected to an associated actuable gate which is opened or closed depending on the binary condition of each of the actuable devices of the portion. In any event, only one actuable gate is actuated or selected during the first time period. The output of each of the actuable gates is connected to each of the interconnections of the second of two groups of interconnections and each is common to a number of actuable devices.

In a second time period, the first group of common interconnections is activated from a register or pulsed sources supplying voltages over the interconnections to commonly connected actuable devices. Simultaneously with the application of voltages over the first group of interconnection another voltage is applied in common to all the actuable gates. This latter voltage is passed, however, only through the previously selected gate to actuate those actuable devices connected to one of the second group of interconnections associated with the enabled gate and to which voltages are applied simultaneously over the first group of interconnections.

The sensing or reading of the condition of the actuable devices after placing them in a desired condition or selecting an actuable device to pass a current, is carried out in a manner similar to selecting and conditioning an actuable device. During a first time period, an actuable gate is selected by activating an actuable device of the portion which in turn enables an actuable gate. During a second time period, interconnections connected to a number of actuable devices are connected to sensing devices and, a pulsed source connected to the enabled gate is energized thereby energizing an interconnection common to a group of actuable devices, resulting in a current flow through the sensing devices.

In accordance with a more specific aspect of the invention, a memory consisting of orthogonally disposed bit and word lines which provide inputs to memory cells disposed at the interconnection of the bit and word lines is disclosed. One row of the memory cells is connected to the bit lines and to a separate word line. This row acts as a storage register for an address stored during a first time period. Addressing consists in actuating one out of *n* actuable devices by placing the actuable device, a memory cell, for example, in a binary one condition. Each of the actuable devices of the register is connected to an actuable gate which is actuated or opened by the application of a voltage from the actuable device in the binary one condition. In this manner, only one gate is selected. During a second time period, information is to be stored in the memory and each of the bit lines is energized with a voltage representative of either a binary one or zero. Simultaneously, with the energization of the bit lines, an interconnection common to the actuable gates is energized and a word line associated with the selected or open actuable gate is energized. The application of the voltages to the bit line and the common word lines stores information in those memory cells which are connected to the selected word line in what may be characterized as a writing operation.

During what may be characterized as a reading operation, two time periods in which the bit lines are shared are also required. In a first time period, a gate connected to one word line is selected in the same manner as a word line is selected during the first time period of the writing operatin. In the second time period of the reading operation, the bit lines are connected via switches to sense amplifiers and the pulsed source connected to the enabled gate is activated causing a pulse to be applied on the selected word line. Current flows in the bit lines associated with the activated memory cells depending on their condition and any current flow is detected in the sense amplifiers.

Address information being supplied to the register during the first time period of a writing or reading operation may be in decoded or undecoded form. In the latter, the information is decoded on the substrate on which the array is disposed.

Time sharing may be undertaken over more than an additional time period but, it should be appreciated that an additional register or storage portion on the array is reguired for every additional time period.

The interconnection arrangements discussed briefly hereinabove have their greatest utility in the integrated circuit environment where space and power requirements are at a premium. Thus, where the interconnection arrangements of the present invention are utilized, only two connections, apart from the usual power supply connections, need be made to a semiconductor chip in addition to the bit line connections where formerly, if time sharing of the interconnections was not used, a connection was required for every word line. Thus, in an 8 x 8 array, sixteen interconnections to the chip are required whereas only ten itnerconnections are required using the arrangements of the present invention. The present invention, therefore reduces the total number of interconnections to a chip or substrate very sharply. Also, the number of word drivers is reduced and power dissipation is minimized. These advantages are paid for by an increase of about two times the amount of time required by prior art memory arrays.

It is, therefore, an object of this invention to provide interconnection arrangements which considerably reduce the interconnections required over prior art arrangements.

Another object is to provide interconnection arrangements which in conjunction with temporary storage means permit the time sharing of these interconnections during different time intervals.

Yet another object is to provide interconnection arrangements which are adaptable to the intergrated circuit environment and which materially reduce interconnection, power dissipation, and ancillary device requirements.

The foregoing and other objects, features and advantages of the present invention will be apparent from the following more particular description of preferred embodiments of the invention as illustrated in the accompanying drawings.

Figure 1:
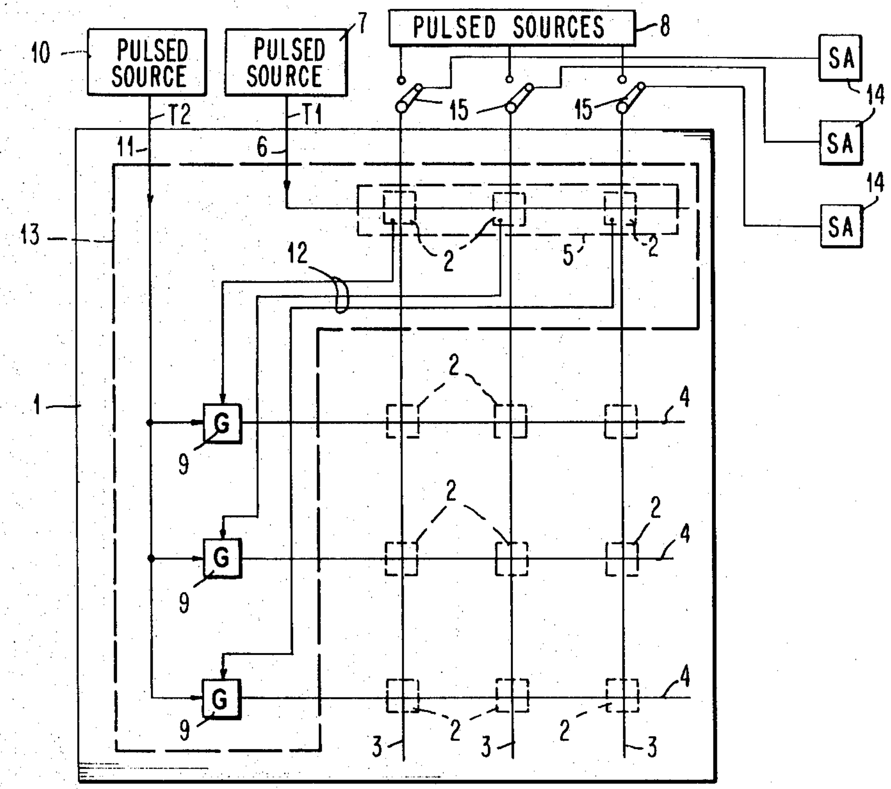
FIG. 1 is a schematic diagram of a plurality of actuable devices arranged in array form on a semiconductor, a portion of which in conjunction with a plurality of actuable gates acts to select one of the gates during a first time period. The selected gate which is connected to a number of actuable devices in conjunction with interconnections commonly used during the first and a second time period actuates the devices connected thereto upon application of voltage to the gate and the common interconnection during a second time period.

FIG.: 3 is a schematic diagram of an array of actuable devices similar to that shown in FIG. 1. The arrangement shown utilizes two additional time periods permitting an increase in bit density without increasing the bit lines.

Figure 4:
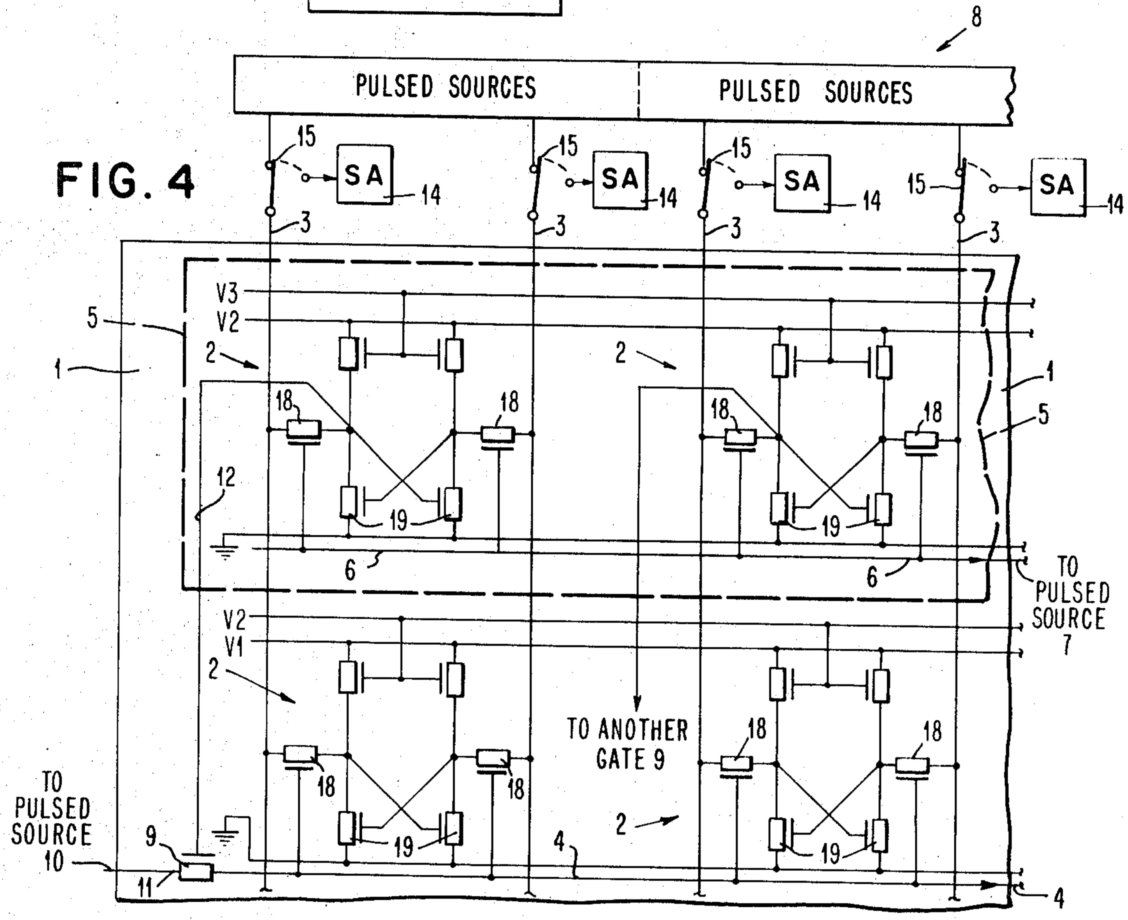

FIG. 4 is a schematic diagram showing FET devices arranged for operation as a register and as memory cells in the arrays of the previous figs.

DESCRIPTION OF A PREFERRED EMBODIMENT

Referring now to FIG. 1, a substrate 1, preferably a semiconductor chip is shown having a plurality of actuable devices 2 disposed on the surface of substrate 1. Actuable devices 2 may be any suitable memory cell, bistable circuit or other actuable device requiring at least two inputs for actuation. Devices 2 are shown as dotted boxes in FIG. 1 for purposes of explanation. A detailed description of an appropriate device will be outlined in what follows. Interconnections 3 and 4 are shown in intersecting relationship in FIG. 1 in the vicinity of devices 2. While not specifically shown, it should be assumed that each of devices 2 has an electrical connection to interconnections 3 and 4.

A portion of devices 2 shown in FIG. 1 surrounded by dotted box 5, hereinafter referred to as portion or register 5, are each connected electrically to interconnections 3 but differ from other devices 2 in that they are operable during a different time period than the other devices 2. A separate interconnection 6 is connected to each of the devices 2 of portion 5. A pulsed source 7 disposed off the substrate 1 provides a voltage which is simultaneously applied to the devices 2 of portion 5 via connection 6. Pulsed sources 8 which are also disposed off substrate 1 are connected to inter-connections 3 each of which is common to a number of devices 2. Pulsed sources 8 may be a register which provides either a voltage or no-voltage on each of interconnections 3 or may be a multiple votage source whichprovides outputs which are present or not present n interconnections 3. Each of the interconnections 4 is shown connected to an actuable gate 9. Gates 9 are connected in parallel to a pulsed source 10 via interconnection 11. Gates 9 are also connected to devices 2 of portion 5 via interconnections 12. A voltage from a device 2 of portion 5 applied to a gate 9 enables that gate so that a voltage from pulsed source 10 is passed through a gate 9 to its associated interconnection 4.

In FIG. 1, portion 5, gates 9 and interconnections 12 are shown surrounded by a dotted line. These elements together form a selection means 13 and the dotted box surrounding these elements has been so labeled.

In operation, selection means 13 is activated during a first time period to enable one of gates 9 so that devices 2 can be actuated or information can be stored on devices 2 connected to interconnection 4 associated with that gate. After enabling a desired gate 9, pulsed sources 8 are energized in the form of binary ones and zeros along with source 10 and, the information is stored in devices 2 connected to the interconnection which is associated with the enabled gate 9.

In detail, selection of gate 9 is made in the following way. Pulsed sources 7 and 8 provide outputs which set one of the devices 2 portion 5 in the binary one condition. All the other devices 2 of portion 5 are set in the binary zero condition. Assuming that left-hand device 2 of portion 5 is set in the binary one condition, a voltage which may be taken from the node of the OFF side of an FET memory cell, for example, is applied via interconnection 12 to the upper of actuable gates 9. Gates 9 are enabled by the presence of a voltage on interconnections 12. Thus, during a first time period, voltages from sources 7 and 8 cause information in decoded form to be passed to portion or register 5 to be temporarily stored therein thereby enabling only one out of a number of available gates 9.

During a second time period immediately following the first time period, pulsed sources 8 are again actuated in a desired pattern of voltages which apply binary ones or zeros to the devices 2 associated with each of interconnection 3 when the voltages are applied to interconnections 3 along with the application of a voltage to a selected interconnection 4. The interconnection 4 is selected by the previous enabling of upper gate 9 and the required voltage is applied simultaneously from source 10 with the application of voltages to interconnections 3 from sources 8. As a result, devices 2 at the intersection of the uppermost of interconnection 4 and interconnections 3 are actuated. If the devices 2 are memory cells, storage of information results. To store or actuate devices at any other position, a gate 9 associated with a different interconnection 4 is enabled. The references T1 and T2 are shown in FIG. 1 to indicate that sources 7 and 10 are activated during two different time periods.

The actuable devices 2 of FIG. 1 having been actuated or conditioned, can now be activated during another operation which requires the time sharing of certain of the interconnections during at least first and second periods. Thus, the condition of actuable devices 2 which have been actuated can be sensed or a current can be passed therethrough during two time periods different from the first time periods.

To determine the condition of an actuable device 2 which has already been selected and actuated, selection of the actuable device 2 whose condition is to be sensed, is made in the same manner as described in connection with the selection prior to actuation described hereinabove.

Assuming then that the uppermost of actuable gates 9 has been enabled, the condition of devices 2 connected to interconnection 4 associated with the enabled gate 9 can be determined by applying a proper voltage in the next succeeding time period. In the next succeeding time period, a voltage pulse is applied to enabled gate 9 and to its associated interconnection 4 from pulse source 10. Assuming that devices 2 to which the voltage is applied are memory cells, curernt flows in each of interconnections 3 depending on the state of the memory cells. Current flow may be detected in sense amplifiers 14 which are coupled to interconnections 3 via switches 15 during the second part of the sensing period.

The drawing of FIG. 1 has been simplified for purposes of explanation, but it should now be obivous that the number of interconnections 3 and 4 can be increased to provide a larger array of devices 2. For each additional interconnection 3, one interconnection 4 is used requiring an additional actuable gate 9 and an additional device 2 in portion or register 5. While interconnections 3 increase and must be provided for to connect to off-the-substrate source 8, the number of interconnections to energize interconnections 4 remains the same. Thus, the larger the array, the greater is the relative reduction in the number of interconnections.

Figure 2:
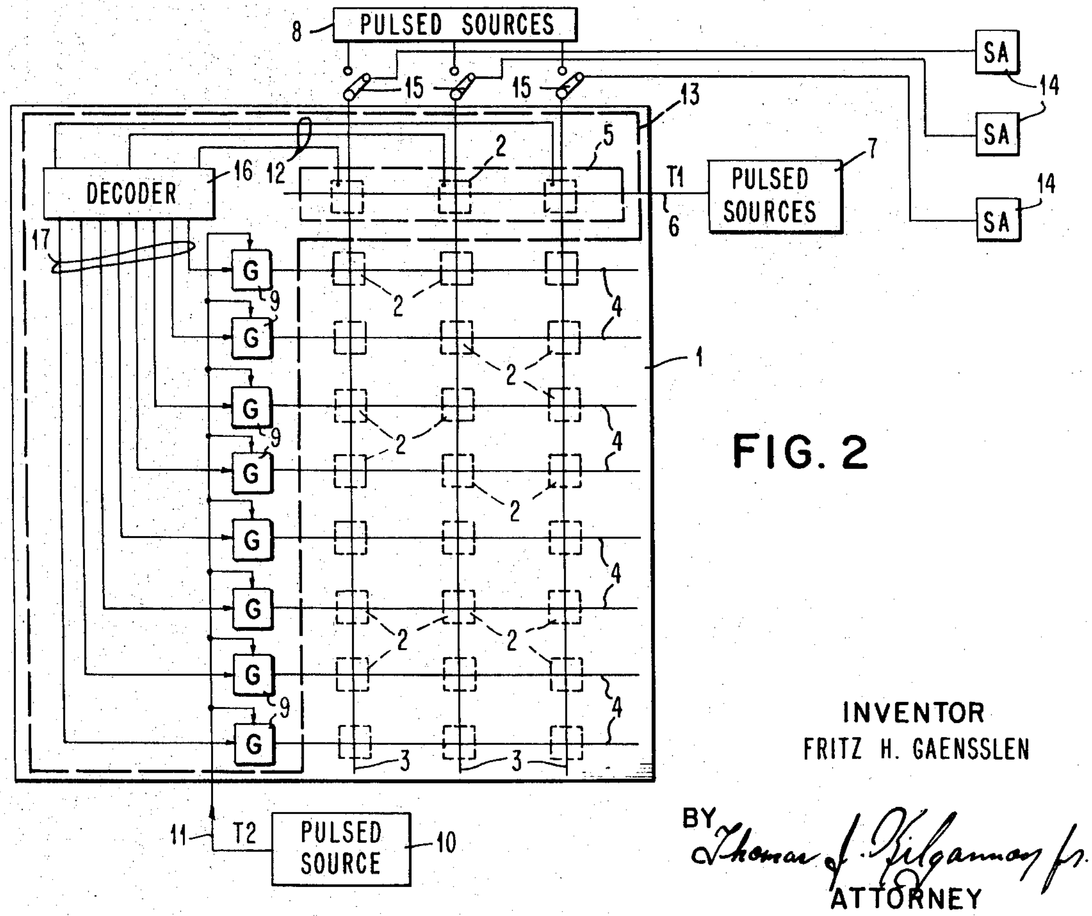
FIG. 2 is a schematic diagram of plurality of actuable devices arranged in array form similar to that shown in FIG. 1. The arrangement of FIG. 2 utilizes undecoded information thereby requiring a decoder on the semiconductor substrate.

Referring now to FIG. 2, there is shown therein an array similar to that shown in FIG. 1 except that a decoder 16 is included in selection means 13 which is also shown as a dotted box in FIG. 2. Elements shown in FIG. 2 which are the same as elements shown in FIG. 1 have the same reference characters. Thus, in FIG. 2 selection means 13 is made up of portion 5, gates 9, and decoder 16.

Each of the elements shown in FIG. 2 operates in the same manner as shown in FIG. 1 with the exception that pulsed sources 8 supply information in undecoded form to portion 5. The three devices 2 of portion 5 may assume, during a first time period, one of eight possible combinations of binary ones and zeros. The condition of portion 5 is fed to decoder 16 via connections 12 where one out of eight output leads 17 is energized to enable a gate 9 connected thereto. Decoder 16 has not been described in detail but, it may be any one of a number of decoders well known to those skilled in the electronic's art. The application of a voltage during a second time period to interconnection 11 and interconnection 3 causes the interconnection 4 associated with the enabled gate 9 to be energized resulting in the actuation of devices 2 connected to that interconnection 4. A consideration of FIG. 2 clearly shows that by the expediency of decoding address information on the chip, it is possible to increase the bit density without changing the number of interconnections over those required in FIG. 1.

The sensing or reading operation is the same as that described in connection with FIG. 1 except that selection of the actuable gate is made via the decoder 16.

Figure 3:
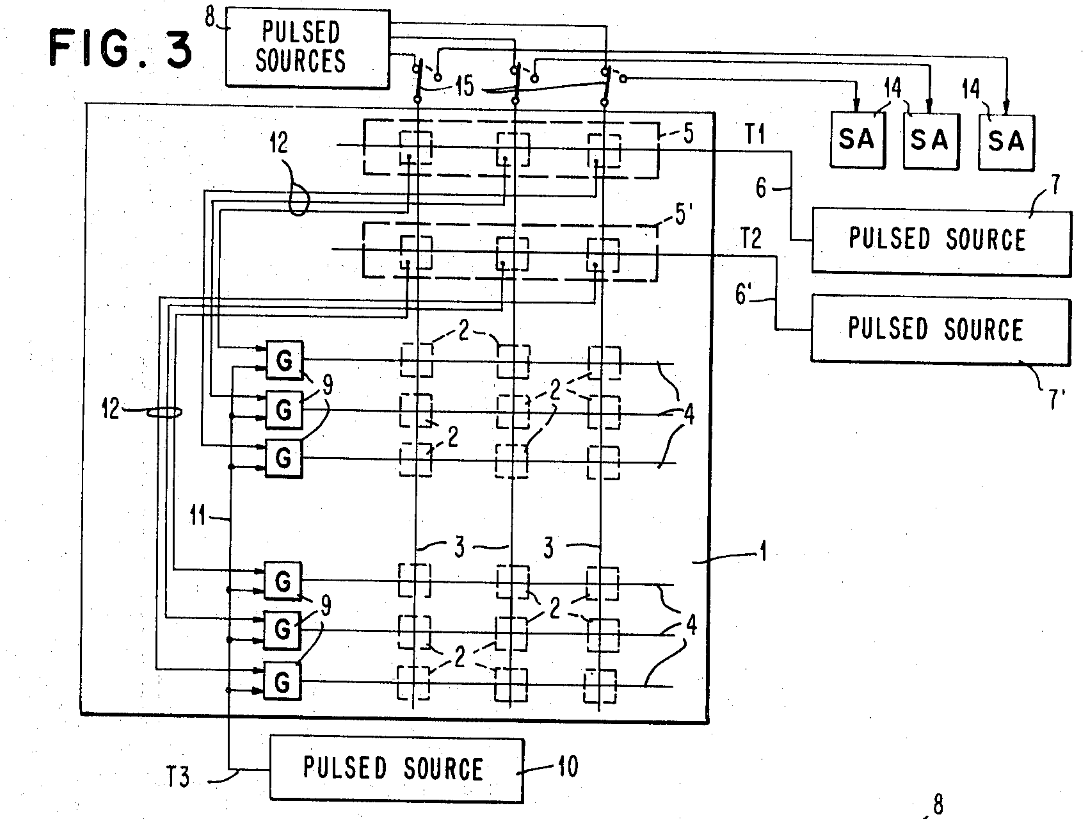

Another variation of FIG. 1 is shown in FIG. 3. In FIG. 3, the arrangement shows an increase in bit density similar to that shown in FIG. 2 without providing a decoder on substrate 1. An increase in bit density is obtained by including another portion or register 5′ similar in every respect to portion 5 except that decoder 5′ is energized over interconnection 6′ during an additional time period. Thus, power dissipation due to the presence of decoder 16 on the chip is saved at the price of an additional register 5′ and an additional interconnection 6′.

In FIG. 3, elements similar to those in FIGS. 1 and 2 have the same reference characters. In operation, selection means 13 selects one out of six gates 9 to actuate a number of devices 2 associated with the interconnection 4 of that gate. During a first time period, portion 5 is actuated from sources 7, 8 in the same manner as described in connection with the operation of portion 5 in FIG. 1. Assuming that portion 5 is actuated to change devices 2 thereof so that each shows a binary zero, its associated gates 9 are not enabled. During a second time period, portion 5′ is activated from pulsed source 7′ and pulsed sources 8 and 10 are energized simultaneously applying tion 5′ is pulsed to show a binary one condition, an enabling voltage will be applied via connection 12′ to the uppermost of gates 9′. During a third time period, pulsed sources 8and 10 are energized simultaneously applying voltages to energize an interconnection 4 connected to enabled gate 9 and applying appropriate voltages to energize interconnections 3. Devices 2 connected to the intersection of the energized interconnections 3, 4, each assume either a binary one or a binary zero condition. As in all the other figures, the devices 2 of FIG. 3 may be any actuable device such as a memory cell or a bistable circuit well known to those skilled in the electronic's art.

Sensing or reading the condition of the actuated devices 2 is carried out in the same manner as described in connection with FIG. 1. Selection of gate 9' may be made in one time period by directly enregizing the register 5', for example, with which the gate 9' to be selected is associated.

Until this point, the interconnection arrangements shown have been characterized in very general terms to indicate that the concepts of FIGS. 1 through 3 have general application to arrangements containing devices which require at least two inputs. FIG. 4 shows a portion of the arrangement of FIG. 1. Actuable devices 2 in FIG. 4 are memory cells which are formed in array fashion on the surface of substrate 1 which is usually a semiconductor such as silicon or germanium. The fabrication of the memory cells of FIG. 4 will not be dealt with here since well known fabrication techniques may be employed in the manufacture of such an array. Memory cells shown in FIG. 4 are made up of a plurality of field effect transistors or FET's. The particular arrangement of FET's including a cross-coupled pair of FET's, and driver and load FET's is similar to the arrangement of these devices treated in detail in an article entitled "Integrated MOS Transistor Random Access Memory" by J. D. Schmidt in Solid-State Design, January 1965.

In FIG. 4, pulsed source 8 provides a purality of outputs to interconnections 3 which serve as bit lines to driver FET's 18. In all the previous Figures, a single interconnection 3 has been shown connected to an actuable device 2. However, in FIG. 4 two interconnections 3 are shown connected to each device 2. This has been done to provide a simple embodiment which avoids complex circuit arrangements and techniques. The arrangement shown in FIG. 4 may be characterized as a double-ended bit line scheme whereas a column of memory cells requiring only one bit line interconnection is characterized as a single-ended scheme. It should be clearly understood that regardless of the type of memory cells or other actuable device utilized that the teaching of the present invention can be used with a resulting reduction in the number of interconnections to a substrate.

Again in FIG. 4, the upper two memory cells are shown surrounded by dotted line 5 indicating that they form a part of portion or register 5 which is actuated during a first time period.

The memory cells of FIG. 4 assume one of two states or are written into upon the application of appropriate voltages to the gates of cross-coupled FET's 19. The voltages are applied via interconnections 3 and driver FET's 18 which are actuated via word line 6, in the instance of portion 5, and word lines or interconnections 4, in the instance of the other memory cells of the array, Word line 6 is separately activated from pulsed source 7 (not shown) while word lines or interconnections 4 are energized from pulsed source 10, via an enabled gate 9 which has been selected during the first time period.

During the first time period, outputs are supplied from pulsed source 8 (which, it should be recalled, is a source of multiple pulses or a register) to interconnections 3 which as bit lines are connected to driver FET's 18. At the same time, a voltage is applied via interconnection 6 from pulsed source 7 to the gates of FET's 18, turning those devices ON. Depending on the polarity of the voltages applied via interconnections 3, one of the cross-coupled FET's 19 in each cell is turned ON and the other is turned OFF. Using the left-hand device 2 of portion 5 voltages are applied to the gates of FET's 19 17 which turn the right-hand FET 19 ON and the left-hand FET 19 OFF. If the FET's are npn or n-channel devices, a positive voltage at the gate thereof is required to turn such a device ON assuming all other voltages are appropriate and, a zero voltage at the gate of such a device is required to turn it OFF. Also, assume that the right-hand FET 19 of the memory cell in the ON condition represents a binary one. Applying a positive voltage to the gate of right-hand FET 19 via FET 18 and maintaining the gate of left-hand FET 19 at ground potential turns right-hand FET 19 ON. When the potentials are removed from interconnections 3, 6, the memory cell maintains its condition and, during its quiescent state, a positive potential is maintained on the gate of right-hand FET 19 of left-hand memory cell of portion 5. This potential is communicated via connection 12 to an actuable gate 9 which in FIG. 4 is an FET having the potential applied to its gate electrode. It should be noted that gate 9 is connected via common connection 11 to pulsed source 10 (not shown) and to interconnection 4 which acts as a word line for the actuable devices 2 (memory cells) connected to it.

During a second time period, pulsed source 8 is energized and information to be stored is applied to interconnections 3 which are common to all the memory cells in a column. At the same time, a voltage is applied from pulsed source 10 (not shown) to common connection 11 to each of the actuable gates 9 which in turn are connected to other interconnections 4 (not shown). Since only the left-hand memory cell of portion 5 has assumed the binary one condition, only that gate 9 associated with it is enabled and information is stored only in those memory cells associated with the interconnection 4 which is connected to that gate 9. Thus, all the memory cells in the row beneath portion 5 will be actuated during a second time period and information in the form of binary ones and zeros stored therein. It should be obvious that enabling any other gate 9 selects that row of memory cells associated with the interconnection 4 connected to that gate.

Reading of the memory cells of FIG. 4 is accomplished during a first time period of the reading operation, by selecting gate 9 in the same manner as was done during the first time period of the writing operation. During a second time period of the reading operation, a voltage is applied from source 10 via connection 11 and gate 9 to word line 4. Application of the pulse causes FET's 18 to conduct thereby providing a path from ground via ON FET 19 (right-hand FET of the memory cell), bit line 3 and switch 16 to sense amplifier 17.

What has been disclosed is a preferred embodiment of the present invention including several variations thereof and the preferred embodiment incorporating an FET memory cell. The arrangements disclosed all reduce the number of interconnections required to a semi-conductor substrate by in effect trading time for interconnections.

It should be appreciated, if it is not already obvious, that the rows and colums in the arrays of FIG. 1–4 can be extended to the limits of practicality. The number of devices shown in the figures have been limited only for illustrative and simplification purposes.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Time shared interconnection apparatus comprising:
a plurality of actuable devices,
selection means activated during at least first and second time periods including a portion of said actuable devices for selecting at least one of said devices of the remainder of said actuable devices each device of said portion having a common interconnection with at least another device in the remainder of said actuate devices, a plurality of actuable gates each being interconnected to a different one of said actuable devices of said portion and to at least an actuable device in the remainder of said actuable devices.

2. Time shared interconnection apparatus according to claim 1 further including:

first and second pulsed sources connected to said portion the simultaneous activation of which during a first time period actuates at least one of said actuable devices thereof and a third pulsed source connected to actuable gates the simultaneous activation of which with said first source during a second time period actuates at least one of said actuable devices of said remainder.

3. Time shared apparatus according to claim 1 wherein said actuable devices are devices requiring at least two inputs for actuation.

4. Time shared interconnection apparatus according to claim 1 wherein said selection means further includes:

decoding means connected to said at least a portion of said actuable devices for selecting at least one of said devices in the remainder of said actuable devices and said actuable gates.

5. Time shared interconnection apparatus according to claim 1 further including:

means connected to said selection means for energizing said selection means during said at least first and second time periods.

6. Time shared interconnection apparatus according to claim 1 further including:

means connected to said selection means for determining the condition of at least one of said actuable devices of said remainder during periods different from said first and second time periods.

7. Time shared interconnection apparatus according to claim 5 wherein said means for energizing said selection means during said at least said first and second time periods includes:

at least first, second and third pulsed sources connected to said selection means, the simultaneous activation of said first and second sources actuating at least one of said actuable devices of said portion during said first time period, and the simultaneous activation of said first and third sources actuating at least one of said actuable devices from said remainder during a second time period.

8. Time shared interconnection apparatus according to claim 4 wherein said decoding means has a plurality of outputs, each of which is connected to a different one of said actuable gates.

9. Time shared interconnection apparatus according to claim 7 wherein said first pulsed source is a multiple output source, the number of outputs corresponding to the number of actuable devices of said portion.

10. Time shared interconnection apparatus according to claim 6 wherein said means for determining the condition of said actuable devices during periods different from said first and second time periods includes:

at least first, second and third pulsed sources connected to said selection means, the simultaneous activation of said first and second sources actuating at least one of said actuable devices of said portion succeeding said second time period, the activation of said third source during the next succeeding time period activating at least an actuable device of said remainder and sensing means connected to said selection means during said next succeeding time period responsive to the condition of said at least an actuable device of said remainder.

11. Time shared interconnection apparatus according to claim 10 wherein said sensing means includes a sense amplifier.

12. Time shared interconnection apparatus according to claim 8 further including:

first and second pulsed sources connected to said least a portion the simultaneous activation of which actuates at least one of said actuable devices thereof and a third pulsed source connected to said actuable gates the simultaneous activation of which with said first source actuates at least one of said actuable devices of the remainder, the sole actuation of which in the presence of an actuated actuable device provides an output and means connected to said portion for sensing said output.

13. Time shared interconnection apparatus according to claim 7 wherein said first pulsed source is a multiple output source, the number of outputs corresponding to the number of actuable devices of said portion.

14. A monolithic memory having time shared interconnections comprising:

a semiconductor substrate, a plurality of transistor storage cells formed in an array and integral with said substrate, a plurality of bit-sense lines each interconnecting a column of said cells, a plurality of word lines each interconnecting a row of said cells, register means integral with said array for storing address information during a first time period electrically connected to said bit-sense lines, gating devices responsive to said address information interposed in each of said word lines and connected to said register for enabling at least one of said gating devices, means coupled to said gating devices for energizing a word line coupled to said enabled gate during a second time period and, means coupled to said bit lines for energizing said cells coupled to said bit lines during said first and second time periods.

15. A monolithic memory according to claim 14 further including:

means coupled to said energized cells for determining the condition of said energized cells during a period succeeding said first and second time period.

16. Time shared interconnection apparatus comprising:

a substrate, a plurality of actuable devices requiring at least two inputs for actuation disposed thereon, selection means activated during at least first and second time periods including at least a portion of said actuable devices for selecting at least one of said devices of the remainder of said actuable devices, each device of said portion having a common interconnection with at least another device in the remainder of said actuable devices, a plurality of actuable gates disposed on said substrate each being interconnected to a different one of said actuable devices of said portion and to at least any actuable device of said remainder of actuable devices.

17. Time shared interconnection apparatus according to claim 16 further including:

means remote from said substrate connected to said selection means for energizing said selection means during said at least first and second time periods.

18. Time shared interconnection apparatus according to claim 16 wherein said substrate is a semi-conductor substrate.

19. Time shared interconnection apparatus according to claim 17 further including:

means remote from said substrate connected to said selection means for energizing said selection means during time periods succeeding said first and second time periods and means connected to said at least a portion for sensing the condition of at least one of the actuable devices of the remainder.

20. Time shared interconnection appartus comprising:

a substrate, a plurality of actuable devices and a plurality of actuable gates disposed thereon, selection means activated during at least a first time period including a portion of said actuable devices and a plurality of actuable gates for selecting at least one of said devices of the remainder of said actuable devices, each device of said portion having a common interconnection with at least another device in the remainder of said actuable devices and with a different one of said actuable gates, means coupled to said portion for actuating at least one of said actuable devices thereof and at least an actuable gate during said first time period, means coupled via an actuable gate to at least one of said devices of the remainder of said actuable devices for actuating said device during another time period.

21. Time shared interconnection appratus according to claim 20 further including:

means coupled to an actuable gate and to said at least one of said devices of the remainder of said actuable devices for sensing the condition thereof during still another time period.

22. Time shared interconnection appratus according to claim 20 wherein said means coupled to said portion includes:

first and second pulsed sources said first source having a plurality of outputs each of which is connected to an actuable device of said portion and said second source being connected in common to the devices of said portion.

23. Time shared interconnection apparatus according to claim 20 wherein said means coupled to the remainder of said actuable devices includes:

first and third pulsed sources said first source having a plurality of outputs each of which is connected to at least a different one of the remainder of said actuable devices, and said third source having an output connected to at least one of the remainder of said actuable devices via an actuable, gate the outputs of said sources being coincident at at least one of the remainder of said devices thereby actuating said device.

24. Time shared interconnection apparatus comprising:

a semiconductor substrate, a first plurality of actuable devices integral with said substrate, a first plurality of interconnections each of said interconnections being common to a portion of said actuable devices, a second plurality of interconnections each of said interconnections being common to a portion of said actuable devices, register means including a second plurality of actuable devices connected to said first plurality of interconnections, and to a common connection, a plurality of actuable gates each being connected to a different one of said second plurality of actuable devices, each of said gates having an output connected to a different one of said second plurality of interconnections, means connected to said register means for actuating at least one of said second plurality of actuable devices during a first time period to select at least one of said actuable gates and, means connected to said first plurality of interconnections and to said actuable gates for energizing said actuable devices connected to one of said second plurality of interconnections via said gate selected during said first time period during a second time period.

25. Time shared interconnection apparatus according to claim 24 further including:

means connected to said energized actuable devices for sensing their condition during a time period succeeding said second time period.

26. Time shared interconnection apparatus according to claim 24 wherein said first and second plurality of actuable devices are unipolar devices and wherein said actuable gates are unipolar devices.

References Cited

UNITED STATES PATENTS

| | | | |
|---|---|---|---|
| 3,363,115 | 1/1968 | Stephenson | 307—291 |
| 3,218,613 | 11/1965 | Gribble | 340—173 |

TERRELL W. FEARS, Primary Examiner

U.S. Cl. X.R.

307—293, 303; 340—172.5